S. SHORT.
Bake Oven.
No. 421.
Patented Sept. 6, 1837.
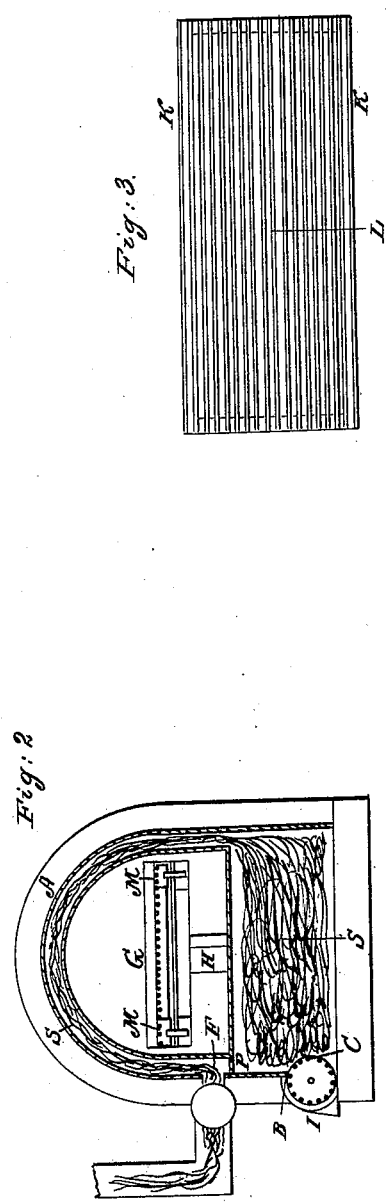
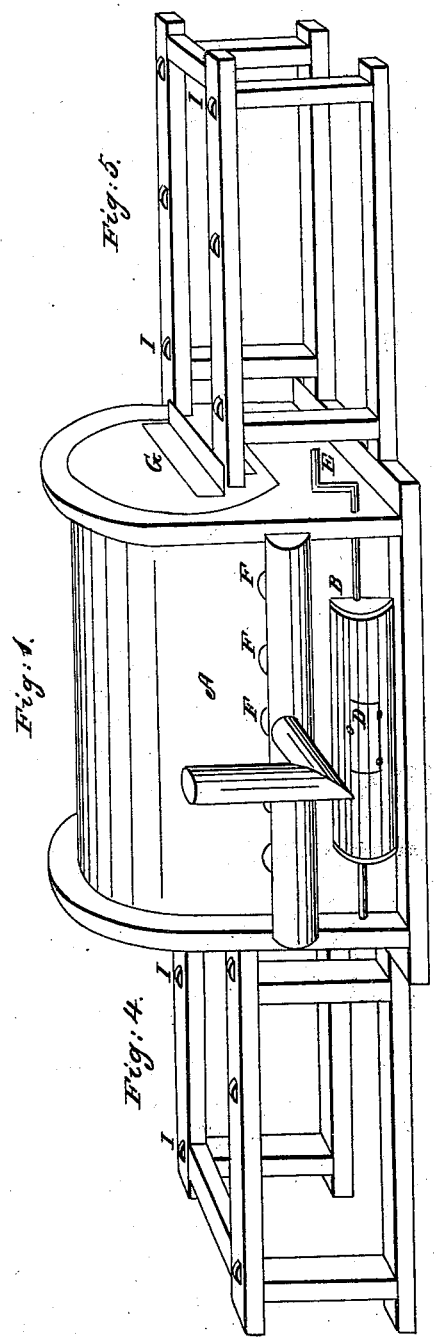

UNITED STATES PATENT OFFICE.

SEWALL SHORT, OF NANTUCKET, MASSACHUSETTS.

RAILWAY-OVEN FOR BAKING BREAD AND OTHER ARTICLES.

Specification of Letters Patent No. 421, dated September 6, 1837.

*To all whom it may concern:*

Be it known that I, SEWALL SHORT, of Nantucket, in the county of Nantucket and State of Massachusetts, have invented a new and useful Improvement in Ovens for Baking Bread, called "Short's railway-oven," which is described as follows, reference being had to the annexed drawings of the same, making part of this specification.

The nature of my improvement consists in constructing an oven of brick of any convenient length, width, and height, with an horizontal bottom, vertical sides and ends, and arched top, having an oblong opening in one side, in which there is placed a cylindrical revolving grate of the requisite size to contain the necessary quantity of fuel for heating the oven; also apertures in the same side for the smoke flues; likewise a rectangular opening in each end to admit a carriage (on which is placed the bread to be baked) to run in at one end and out at the other; also another aperture in each end for baking articles when such heat is required, and for drying wood and other substances—there being constructed within the oven a permanent rectangular frame, in which are made to turn on axles in the side pieces of said frame any convenient number of small wheels; corresponding frames and wheels being placed outside the oven at each end in order to prolong or continue the way to any required distance; the carriage to convey the bread, which travels over these wheels, consisting of two parallel rails channeled or grooved on the under side to admit said wheels, said rails or bars being united at the ends by cross bars and the space within the four sides of the carriage covered with parallel wires, or a wire reticulation, on which the pieces of dough to be baked are placed; and within said brick oven, and surrounding the frame and rollers before mentioned, there is constructed a metallic oven of a corresponding figure, but of lesser size so as to leave a space between the two of about three inches on the sides and top and twelve inches on the bottom, for the circulation of heat and smoke between them.

In baking with this oven the wire hearth of one of the carriages is filled with bread to be baked and run into the oven. While this batch is baking, another hearth at the other end of the oven is being supplied with a fresh batch. The first being sufficiently baked is drawn back upon its rail way and the other run into the oven; this being sufficiently baked is drawn back upon its rail way and the first mentioned carriage again run in and so on.

Figure 1 in the annexed drawings represents a perspective view of the oven in which A is the oven. B space for the circular revolving grate. C circular revolving grate. D door for the insertion of the fuel. E, crank for turning the same. F apertures for the flues. G opening for the introduction of the carriage on which the dough is placed to be baked. H opening for the introduction of articles to be baked, or substances to be dried.

Fig. 2 is a cross section of the oven in which A is the oven. B space for the circular revolving grate. C grate. F apertures for flues. G opening for the exit of the carriage. H opening for the introduction of articles to be baked or dried. I cover or blower of the grate. S space between the inner and outer oven for the circulation of the heat and smoke.

Figs. 4 and 5 represent an extension of the way. I rollers turning in the upper side pieces of the frame thereof.

Fig. 3. View of the carriage, in which K K are the channeled rails which move over the wheels. L parallel wires or wire reticulation forming the hearth on which the bread to be baked is placed.

M in Fig. 2 represents a sectional view of the channeled rails of the carriage placed upon and moving over the wheels of the rail ways and frame in the oven.

P in Fig. 2 represents a partition between the ovens to prevent the smoke passing up between them on the front side and to cause it to pass entirely around the inner oven.

The invention claimed by me the said SEWALL SHORT and which I desire to secure by Letters Patent consists 1. In the combination of the revolving grate, and the arrangement of the flues, with an oven constructed substantially as above described.

2. The combination of the rail way and carriages with the oven as above described.

SEWALL SHORT.

Witnesses:
CHARLES LEAVENS,
WM. P. ELLIOT.